United States Patent Office 3,366,488
Patented Jan. 30, 1968

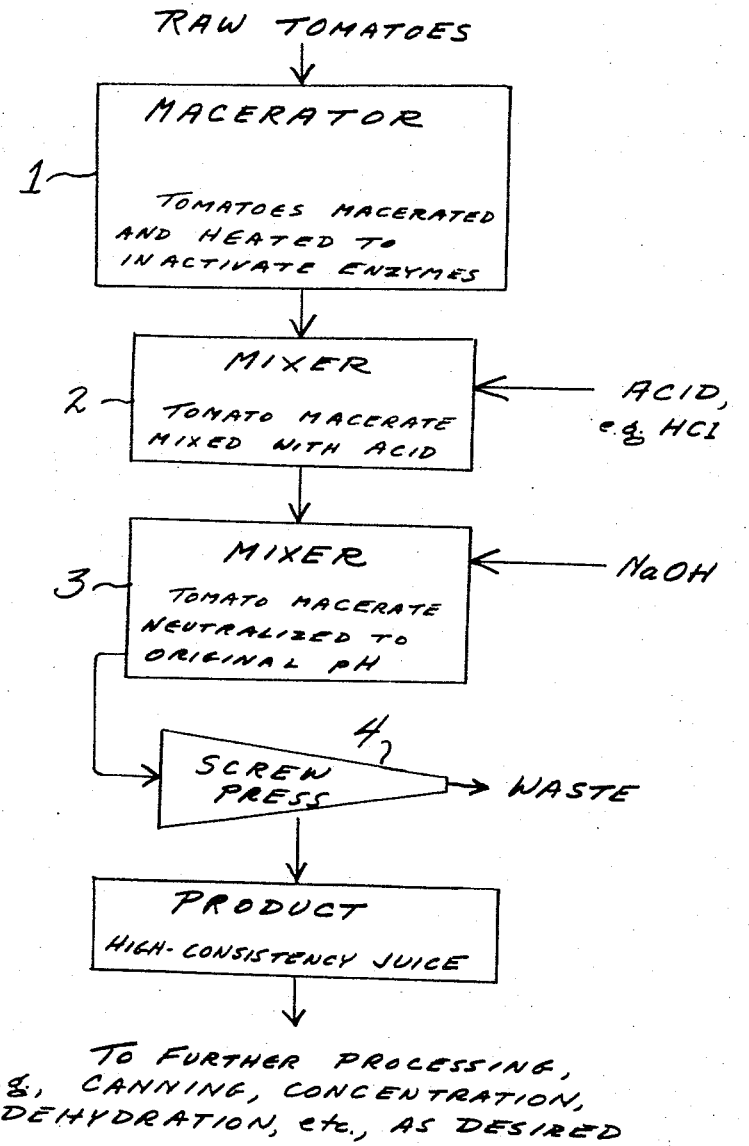

3,366,488
PRODUCTION OF HIGH-CONSISTENCY
TOMATO JUICE
Joseph R. Wagner, Moraga, Jackson C. Miers, Pleasant
Hill, and Horace K. Burr, El Cerrito, Calif., assignors
to the United States of America as represented by the
Secretary of Agriculture
Filed Dec. 9, 1966, Ser. No. 600,659
6 Claims. (Cl. 99—105)

ABSTRACT OF THE DISCLOSURE

In preparing tomato juice, an acidification step is used to yield a thicker juice—one of increased consistency. Typical production of such juice involves: (1) maceration of tomatoes with heating to inactivate enzymes, (2) acidification with HCl or other non-toxic acid (to a pH of less than 3.5) to effect the increase in consistency, (3) neutralization with NaOH to restore natural pH, and (4) separation of juice from the resulting macerate.

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing tomato juice of high consistency. Further objects of the invention will be evident from the following description wherein parts and percentages are by weight unless otherwise specified.

The annexed drawing is a flow sheet illustrating one embodiment of the application of the process of the invention.

It is recognized in the industry that consistency is an important attribute of tomato juice. In particular, higher consistency represents better quality. It is to be especially noted that consistency has no fixed relationship with solids contents so that whereas two lots of tomato juice prepared by different procedures and/or different raw materials may have identical solids contents, their consistencies may be radically different. The matter of consistency is not only important with regard to tomato juice per se but also with regard to products prepared therefrom such as concentrated juice, pastes, sauces, ketchups, etc. In all these products a higher consistency signifies better quality and to attain such quality it is necessary that the juice employed as the starting material be of high consistency.

In our co-pending application Ser. No. 626,364, filed Nov. 4, 1966 (a continuation-in-part of Ser. No. 439,488, filed Mar. 12, 1965), now abandoned, we have shown that tomato juice of increased consistency may be obtained by adding an acid to raw tomatoes and then applying maceration and heating.

We have now found that a comparable result—namely, production of juice of increased consistency—is achieved when the added acid is applied, not to the raw tomatoes, but to tomato material which previously has been subjected to heating to inactivate enzymes. The process of the invention provides certain advantages over the procedure of the above-identified application. One advantage of the present process is that it presents a lesser possibility of corrosion to equipment. This follows because the heating to achieve enzyme inactivation is carried out at the natural pH, in contrast to the previous system wherein such heating is applied at the low pH generated by the added acid. Another advantage lies in power consumption. This situation is explained as follows: In the previously-mentioned process, increase in consistency takes place as the acidified raw tomatoes are macerated whereby considerable resistance to the macerating action develops. In the present process, the increase in consistency is delayed until the steps of maceration and heating have been completed with the net result that power required for the maceration step is less.

Although the process of the present invention is different from the previous one and provides certain advantages, it is not maintained that it will yield juice of as high a consistency as that attained by the previous one (when the two are applied under comparable conditions, e.g., acidification to the same extent). However, the present process does yield higher consistencies over those obtained in conventional procedures and thus provides the practical result desired.

The application of the principles of the invention to the production of tomato juice of increased consistency is further illustrated by the following detailed description.

Raw tomatoes, at their natural pH, are subjected to heating to inactivate the enzymes. This heating can be accomplished in various ways as well known in the art. One technique involves exposing whole tomatoes or pieces of tomatoes to steam or to a source of radiant energy such as infra-red lamps or a microwave irradiation device. Preferably, the tomatoes are heated while concomitantly subjected to maceration. (The term "maceration" is employed herein—in common with its usage in the art—to denote application of mechanical action to break up and subdivide the tomatoes into a pulpy mass.) To achieve such an end, one may utilize the usual heating and macerating procedure as conventional in producing tomato juice by the hot-break system. Thus, raw tomatoes are fed into a vessel provided with steam coils (or steam jackets) and a rotating blade assembly for comminuting the tomatoes and agitating the material in the vessel so that good heat transfer will be obtained. By use of such equipment the raw tomatoes can be efficiently formed into a hot macerate which is ready for the next step. In cases where it is desired to achieve an especially rapid heating, one may employ a "drop-in" technique. This involves establishing a pool of tomato juice or tomato macerate (from a previous batch) in a vessel equipped with heating means and a rotor for comminuting and mixing the contents of the vessel. The pool of juice is maintained at about 200° F. and the tomatoes are fed into it at a predetermined rate. Because of the intimate contact with the hot juice, the entering tomato material is very rapidly brought up to an enzyme-inactivating temperature. The hot macerate produced in the vessel is withdrawn at a rate commensurate with the feed rate and this hot material is forwarded to the next step in the procedure. Various other examples of systems for effectuating the heating—or the concomitant heating and macerating—will be suggested to those skilled in the art from the above description. It is further obvious that regardless of the particular system used, the temperature and time of heating applied to the tomatoes should be sufficient to inactivate the enzymes. It is equally obvious that the program of heating should not be so drastic as to damage the tomato material.

After the tomatoes have been heated to inactivate the enzymes, the resulting tomato material—preferably in the form of a macerate—is mixed with an acid. This step, as outlined above, causes an increase in consistency of the tomato material. The mechanism for this action has not been firmly established. However, it is believed that the addition of the acid causes an increased extraction or transfer of pectinous material from the cellular particles to the liquid (serum) part of the tomato material, so that the material as a whole becomes thicker, i.e., higher in consistency. The amount and type of acid to achieve the desired goal are as described in the aforesaid prior application Ser. No. 626,364: Hydrochloric acid is preferred because it is effective, inexpensive, and particularly because eventual neutralization of the product (with sodium hydroxide) yields sodium chloride—a common additive in tomato products. The hydrochloric acid may be added as such or in the form of hydrogen chloride gas. Moreover, acids other than hydrochloric can be employed as the primary consideration is the establishment of a low pH. Thus, for example, one may employ such strongly-ionized acids as sulphuric, orthophosphoric, metaphosphoric, and pyrophosphoric. Weaker acids such as tartaric or citric may also be used. However, though effective, these weaker acids are not preferred because large proportions are required to attain the necessary reduction in pH. Acetic acid is too weakly-ionized to be of any practical usefulness. In view of the above considerations, generically one may employ any acid which is more strongly ionized than acetic (i.e., has an ionization constant greater than $1.86 \times 10^{-5}$) and which is nontoxic. It is, of course, within the scope of the invention to use mixtures of two or more acids, for example, a mixture of hydrochloric and any of the phosphoric acids.

In general, it has been observed that addition of enough acid to establish a pH in the mixture of less than 3.5 will provide an increase in consistency over that attained in the absence of added acid. Moreover, as the pH is reduced below the aforesaid level, greater increases in consistency are achieved. It has also been observed that as the pH is reduced below about 2, little if any further increase in consistency is attained. Thus, whereas the pH may be decreased to very low levels, there is no practical purpose gained by going below a pH of 1. Usually, we prefer to operate at a pH range of about 2.5 to about 3.0—whereby a large increase in consistency is achieved without requiring excessive amounts of added acid.

Although reduction in pH, as described above, is the critical factor to produce juices of increased consistency, there will be variation in the level of consistency attained at any given pH, depending on such factors as the nature of the tomatoes being treated, and the rate at which the enzymes were inactivated in the previously-applied heating step. Thus other conditions being equal, a juice of higher consistency will be achieved in a situation where the enzyme-inactivation was accomplished rapidly and uniformly throughout the mass of tomato material, than in a case where heating was less rapid or less uniform so that some degree of enzyme action took place before inactivation was established. In general, it is preferred to apply the acid to the tomato material in its hot condition (usually about 185–212° F.) as it is received from the previous enzyme-inactivation step. Application of the acid to the hot tomato material facilitates uniform blending of the acid with the tomato material so that the desired consistency increase is attained rapidly. It is obvious that if the tomato material is not in comminuted form when the acid is applied, the mixture of acid and tomato material is subjected to the action of conventional equipment to obtain a macerating action, thus to attain good contact between the acid and the tomato particles.

After the tomato material has been intimately mixed with the added acid, as described above, the acidified macerate is treated by any of several optional routes to produce a juice. In one alternative system, the acidified macerate without any delay is passed through conventional equipment to separate the juice from the skins, seeds, cores, etc. The juice is then neutralized to its normal pH (usually in the range 3.8–4.5) by incorporation of sodium hydroxide. Other alkaline materials such as sodium carbonate or bicarbonate may be used but are not preferred because of their foaming effect (caused by release of $CO_2$). A more preferable alternative involves first neutralizing the acidified pulp to restore it to the natural pH, as described above, and then passing the pulp to the juice extractor.

A particular advantage of the invention is that it can be applied to conventional juice production lines with but minor changes. Thus, standard juice production by the hot-break method involves a first stage where the tomatoes are macerated and heated to an enzyme-inactivating temperature (usually at least 185° F.). In a second stage the hot macerate is treated to separate the juice from the seeds, skins, and other fibrous material. For modification in accordance with the invention, one may add to such a line (a) a first mixing device for incorporating acid with the hot macerate and (b) a second mixing device for neurtalizing the acidified material before it goes to the juice extractor. It may be noted that such changes in the standard production pattern do not contribute any interference with flow of the tomato material through the system. Thus, addition of the acid does not interfere with or prolong the heating/macerating step and the neutralizing step likewise does not cause any delay in transferring the pulpy mass to the juice extracting step. A typical adaptation of a standard continuous juice production line to operate in accordance with the process of the invention is illustrated in the flow sheet in the drawing annexed hereto.

Referring to the flow sheet, raw tomatoes are continuously fed at a predetermined rate into macerator 1. Therein, the tomatoes are rapidly comminuted and concomitantly heated to about 200° F. The resulting hot macerate flows to mixer 2 together with a flow of acid metered to provide the proper pH. During mixing of the macerate and acid, the consistency is increased as above described. The acidified material then flows to mixer 3 wherein it is blended with a stream of sodium hydroxide solution metered to restore the macerate to its natural pH level. The neutralized macerate is then directed to screw press 4 to separate the juice from the skins, seeds, etc. The juice issuing from the screw press may then be processed in known manner to produce canned juice, concentrated or dehydrated products, etc.

Tomato juice prepared in accordance with the invention may be processed in conventional manner. For example, it may be canned as a single-strength juice or it may be first concentrated to a paste or puree and canned in such state. It may be used, in single strength or concentrated form, in the preparation of soups, sauces, ketchups, preserves, aspic products, etc. Also, it may be converted into solid dehydrated products by such known techniques as concentration followed by foam-mat or vacuum dehydration or by spray drying. It is an important feature of the invention that the color, flavor, and nutrient value of the juice are not impaired so that is is suitable for all the uses for which conventional tomato juice is adapted.

Since the process of the invention produces a high-consistency juice, this product can be blended with conventional juices (ones of lower consistency) to provide a composite juice of intermediate consistency as may be required for a particular application. As an example of such procedure, a juice processing line may be operated for a first period of time in conventional manner and operated for a second period of time with application of the process of the invention, the two juices being then combined to yield the final product. By varying the relative duration of the first and second periods, products of a wide range of consistency can be produced.

The invention is further demonstrated by the following illustrative example.

*Example*

In these runs, the starting material was heated by a "drop-in" technique to attain rapid inactivation of enzyme. Thus, a heated (200° F.) pool of tomato juice was provided to serve as a direct-contact heating medium. Tomatoes were fed into this pool in portions, while applying macerating action and heating to maintain the system at 200° F. Because of the intimate contact with the hot juice, the entering tomato material was very rapidly brought up to the desired temperature. More particulars of the procedure used are given below:

The runs were carried out employing a large "Waring Blendor" equipped with a 1-gallon bowl and a rotating blade assembly in the base of the bowl to cut and blend the material contained therein. A steam coil was also provided for heating the material in the bowl.

At the beginning of each run, 500 grams of previously-prepared tomato juice was placed in the blender and heated to 200° F. and maintained in the range of 190–200° F. throughout the run while rotating the blade continuously.

A 1-kg. lot of fresh tomatoes (cut into quarters) was divided into four portions and these portions were fed into the hot juice at about 15-second intervals. At about 2 minutes from the start of the run, heating was discontinued (by removing the stream coil from the bowl) but operation of the blade was continued to complete breakdown of any fragments of intact tissue. At this point, hydrochloric acid was added to the macerate in an amount to provide a particular pH (as specified below).

After the acid was blended into the macerate (approximately 4 minutes from the start of the run), the macerate was put through a pulper to separate the juice from the skins, seeds, etc. and the juice was cooled. It was then tested for pH and consistency. (In one run, no acid was used, thus to provide a control.)

The juice used as the heated liquid for the runs was a conventional juice. It was prepared by macerating raw tomatoes at their natural pH without any additives, heating to destroy enzymes, and extraction of the juice from the macerate with a conventional pulper.

The results are tabulated below:

| Run | Acid added | pH | Consistency of juice,* seconds |
|---|---|---|---|
| 1 (control) | None | 4.48 | 30.3 |
| 2 | HCl | 3.10 | 43.3 |
| 3 | HCl | 2.52 | 58.5 |
| 4 | HCl | 1.47 | 63.7 |

*Consistency was determined at 25° C. by measuring the time required for 200 ml. of the juice to pass through the 0.125 inch (I.D.) orifice of a 260-ml pipette.

Having thus described the invention, what is claimed is:

1. A process for preparing tomato juice of increased consistency which comprises:
   (a) heating raw tomatoes, at their natural pH, at a temperature and for a time sufficient to inactivate the enzymes, but insufficient to damage the tomatoes;
   (b) mixing the resulting tomato material with an amount of non-toxic acid sufficient to provide a pH less than 3.5; and
   (c) extracting the juice from the resulting mixture.

2. The process of claim 1 wherein the acid is hydrochloric acid.

3. The process of claim 1 wherein the acid is hydrochloric acid in an amount to provide a pH of about 2.5 to 3.

4. The process of claim 1 wherein the raw tomatoes are macerated concomitantly with the heating of step (a).

5. The process of claim 1 wherein the acidified tomato material resulting from step (b) is neutralized to its natural pH by addition of non-toxic alkaline material, prior to extraction of the juice therefrom.

6. The process of claim 1 wherein the juice is neutralized to its natural pH by addition of a non-toxic alkaline material.

References Cited

UNITED STATES PATENTS

| 2,928,744 | 3/1960 | Ponting | 99—105 |
| 2,434,388 | 1/1948 | Brehm | 99—154 |
| 2,291,704 | 8/1942 | Fisher | 99—154 |

OTHER REFERENCES

Tressler et al. Fruit and Vegetable Juices AVI Pub. Co. 1939, pp. 300–313.

Food Technology "Effect of Tomato Cell Structure on Consistency of Tomato Juice" vol. 11, pp. 19–22, 1957.

A. LOUIS MONACELL, *Primary Examiner.*

M. VOET, *Assistant Examiner.*